United States Patent
Xu

(10) Patent No.: US 9,891,040 B2
(45) Date of Patent: Feb. 13, 2018

(54) METHOD AND ELECTRONIC DEVICE FOR MEASURING A DISTANCE

(71) Applicant: LENOVO (BEIJING) LIMITED, Beijing (CN)

(72) Inventor: Li Xu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 413 days.

(21) Appl. No.: 14/560,633

(22) Filed: Dec. 4, 2014

(65) Prior Publication Data
US 2015/0300814 A1    Oct. 22, 2015

(30) Foreign Application Priority Data
Apr. 16, 2014 (CN) .......................... 2014 1 0153338

(51) Int. Cl.
| | | |
|---|---|---|
| *H04N 7/18* | (2006.01) | |
| *G01B 11/02* | (2006.01) | |
| *G06T 7/55* | (2017.01) | |
| *G01S 7/497* | (2006.01) | |

(52) U.S. Cl.
CPC ............. *G01B 11/026* (2013.01); *G06T 7/55* (2017.01); *G01S 7/497* (2013.01); *H04M 2250/52* (2013.01)

(58) Field of Classification Search
CPC ................ G06K 9/00651; G06T 2207/30221
USPC ........................................................ 348/140
See application file for complete search history.

(56) References Cited

U.S. PATENT DOCUMENTS

| | | | | |
|---|---|---|---|---|
| 2003/0091228 A1* | 5/2003 | Nagaoka | ............ | G06K 9/00651 382/154 |
| 2005/0261849 A1* | 11/2005 | Kochi | ................... | G06T 7/0018 702/85 |
| 2014/0267775 A1* | 9/2014 | Lablans | ................. | H04N 5/247 348/169 |

FOREIGN PATENT DOCUMENTS

| | | |
|---|---|---|
| CN | 101876532 A | 11/2010 |
| CN | 102095469 A | 6/2011 |
| CN | 103075998 A | 5/2013 |
| CN | 103499334 A | 1/2014 |

* cited by examiner

*Primary Examiner* — Jessica M. Prince
*Assistant Examiner* — Masum Billah
(74) *Attorney, Agent, or Firm* — Scully Scott Murphy & Presser

(57) ABSTRACT

The present disclosure provides a method for measuring a distance. The method may comprise: controlling an image collection unit to collect an image of an object at a measuring position to obtain a first picture including the object; determining a first displaying area of the object in the first picture; controlling the image collection unit to collect an image of the object at a reference position to obtain a second picture including the object, the measuring position being different from the reference position; determining a second displaying area of the object in the second picture; obtaining a first actual distance from the measuring position to the reference position; and determining a second actual distance from the object to the measuring position based on the first displaying area, the second displaying area and the first actual distance. Meanwhile, the present disclosure further discloses an electronic device.

11 Claims, 3 Drawing Sheets

_US 9,891,040 B2_

METHOD AND ELECTRONIC DEVICE FOR MEASURING A DISTANCE

CROSS-REFERENCE TO RELATED APPLICATION(S)

This application claims priority to a Chinese Application No. 201410153338.0, filed on Apr. 16, 2014, which is incorporated herein by reference in its entirety.

TECHNICAL FIELD

The present disclosure relates to the electronic field, and particularly, to methods and electronic device for measuring distance.

BACKGROUND

With the development of science and technology, the smart mobile phones have been popularized and bring convenience to the people's daily life.

In accordance with one technique, when an object is captured by a smart mobile phone, two pictures of the object which are captured at different capturing angels by two cameras in a manner of stereoscopic vision and a corresponding depth image is generated, so that the actual distance from the object to the smart mobile phone is determined.

In the method for measuring a distance mentioned above, if a distance from an object far away should be measured, the distance between the two cameras needs to be increased (by taking an actual distance from the object to the smart mobile phones beyond 1000 meters as an example, the distance between the two cameras is at least a counts of meters). However, since in the procedure of designing a smart mobile phone, it is mainly focused on the portability of the mobile phone and the size is strictly limited, it leads to that the method for manufacturing the distance of as mentioned above cannot measure the distance of the object in a long distance.

SUMMARY

There is provided a method for measuring a distance. The method may comprise steps of: controlling the image collection unit to collect an image of an object at a measuring position to obtain a first picture including the object; determining a first displaying area of the object in the first picture; controlling the image collection unit to collect an image of the object at a reference position to obtain a second picture including the object, the measuring position being different from the reference position; determining a second displaying area of the object in the second picture; obtaining a first actual distance from the measuring position to the reference position; and determining a second actual distance from the object to the measuring position based on the first displaying area, the second displaying area and the first actual distance.

In another aspect of the present disclosure, there is provided a technical solution according to one embodiment of the present disclosure as follows based on the same inventive concept: an electronic device including an image collection unit or connected to an image collection unit. The electronic device may comprise: a first collecting unit configure to control the image collection unit to collect an image of an object at a measuring position to obtain a first picture including the object; a first determining unit configured to determine a first displaying area of the object in the first picture; a second collecting unit configured to control the image collection unit to collect an image of the object at a reference position to obtain a second picture including the object, the measuring position being different from the reference position; a second determining unit configured to determine a second displaying area of the object in the second picture; an obtaining unit configured to obtain a first actual distance from the measuring position to the reference position; and a third determining unit configured to determine a second actual distance from the object to the measuring position based on the first displaying area, the second displaying area and the first actual distance.

In a further aspect of the present disclosure, there is provided a non-transitory computer readable medium storing a computer program, the computer program comprising computer program code means adapted to perform all the steps of the method as mentioned above when said program is run on a computer.

BRIEF DESCRIPTION OF THE DRAWINGS

In order to clearly illustrate the technical solution of the embodiments of the present disclosure, the accompany figures used in the embodiments should be simply illustrated. It is obvious that the accompany figures only illustrate some embodiments of the present disclosure and other accompany figures can be obtained from these figures for those skilled in the art without any inventive labors.

DETAILED DESCRIPTION OF THE EMBODIMENTS

The present disclosure provides methods and electronic device for measuring distance to solve the technical problem that the method for measuring a distance can't measure the object in a long distance.

In order to solve the technical problem as mentioned above, the general concept of the technical solution according to embodiments of the present disclosure is shown as follows.

A method for measuring a distance, applied to an electronic device including an image collection unit or connected to an image collection unit, is provided. The method comprises steps of: controlling the image collection unit to collect an image of an object at a measuring position to obtain a first picture including the object; determining a first displaying area of the object in the first picture; controlling the image collection unit to collect an image of the object at a reference position to obtain a second picture including the object, the measuring position being different from the reference position; determining a second displaying area of the object in the second picture; obtaining a first actual distance from the measuring position to the reference position; and determining a second actual distance from the object to the measuring position based on the first displaying area, the second displaying area and the first actual distance.

The technical solution according to embodiments of the present disclosure will be clearly described in connection with the accompany figures. It is obvious that the illustrated embodiments are a part of the embodiments of the present disclosure and are not the whole embodiments. Other embodiments obtained by those skilled in the art on the basis of the embodiment of the present disclosure without inventive labors fall in the scope of the present disclosure.

Figure 1:
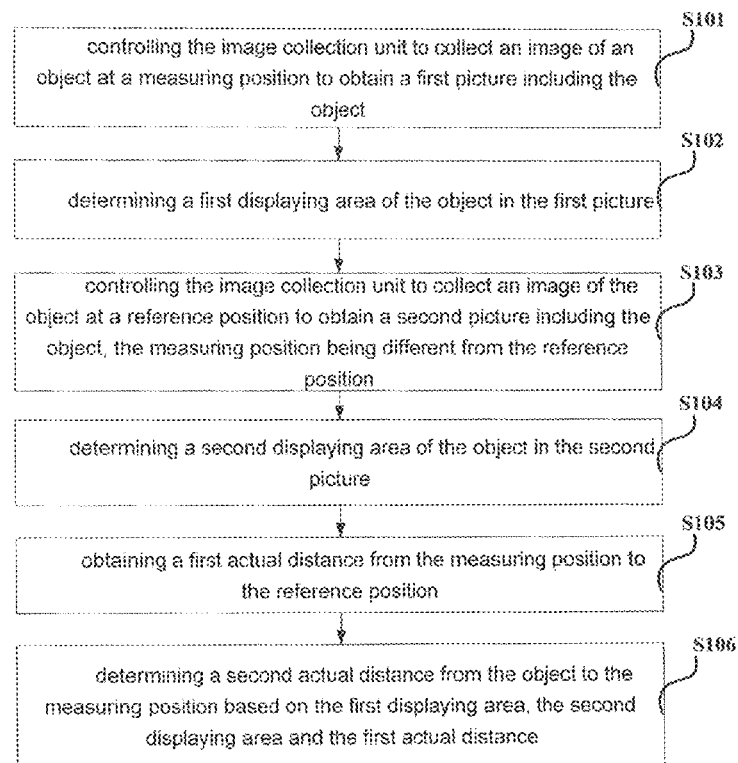
FIG. 1 is a flowchart of the method for measuring a distance according to an embodiment of the present disclosure.

One embodiment of the present disclosure provides a method for measuring a distance. As shown in FIG. 1, the method for measuring a distance comprises: a step of S101, controlling the image collection unit to collect an image of an object at a measuring position to obtain a first picture including the object; a step of S102, determining a first displaying area of the object in the first picture; a step of S103, controlling the image collection unit to collect an image of the object at a reference position to obtain a second picture including the object, in which the measuring position is different from the reference position; a step of S104, determining a second displaying area of the object in the second picture; a step of S105, obtaining a first actual distance from the measuring position to the reference position; a step of S106, determining a second actual distance from the object to the measuring position based on the first displaying area, the second displaying area and the first actual distance.

For example, the electronic device may be an electronic device such as a smart mobile phone, a tablet computer and a digital camera. The electronic device includes an image collection unit, or is connected to an image collection unit. There is not a limitation on the particular type of the electronic device, as long as the electronic device may capture pictures through an image collection unit (e.g. a camera).

For example, the object may be any objects (such as building, vehicle, person as the like). There is not any limitation on the particular type of the object. Herein, the object may be far away from the electronic device (e.g. tens of meters, hundreds of meters, or thousands of meters).

For example, in the step of S105, the first actual distance may be obtained by a GIS (Geographic Information System), or the first actual distance may be determined by some specific sensors.

In the embodiment, since the displaying area of the object in the picture may reflect the actual distance from the object to the electronic device (in general, the larger the displaying area is, the smaller the corresponding actual distance is; and the smaller the displaying are is, the larger the corresponding actual distance is) and the measuring position and the reference position can be freely adjusted by the user without any limitation on the size of the mobile phone, the technical problem in which the method for measuring a distance can't measure the long distance far away can be effectively solved by the present embodiment, and the object at a long distance may be measured so as to get a technical effect of improving the user's experience.

Furthermore, in the method for measuring a distance based on a depth image, it needs to calibrate the camera before the depth image of the object is obtained. In the present embodiment, any of calibration of camera is needed so that the technical solution is relatively simple.

Furthermore, in the method for measuring a distance based on a depth image, since the depth image is employed to determine the actual distance from the pixel of the object to the electronic device, there are disadvantages such as large errors, instable system and poor robustness. However in the present embodiment, since the actual distance from the object to the measuring position is determined based on the displaying area of the object in the picture, there are advantages such as lower errors, higher stability the system and better robustness.

Furthermore, in the method for measuring a distance based on a depth image, two (or more) cameras are needed to obtain a depth image of the object. However, in the present embodiment, only one camera is used to measure the distance, which saves the number of the cameras and simply the hardware, so that the cost for implementation is saved.

Alternatively, the step of S102 may comprise steps of: determining M characteristic pixel points from the first picture, in which the M characteristic pixel points are pixel points at edges of the object in the first picture, and M is a positive integer; and determining the first displaying area based on the M characteristic pixel points.

For example, an edge detection may be performed according to RGB (Red, Green, Blue) information of the respective pixels in the first picture to obtain the M characteristic pixel points and it is determined that a displaying area constituted of the pixels within the M pixel points (including the M pixel points) is the first displaying area.

Alternatively, the step of S104 may comprise steps of: determining N characteristic pixel points from the second picture, in which the N characteristic pixel points are pixel points at edges of the object in the second picture and N is a positive integer; and determining the second displaying area based on the N characteristic pixel points.

For example, an edge detection may be performed according to RGB (Red, Green, Blue) information of the respective pixels in the second picture to obtain the N of characteristic pixel points and it is determined that a displaying area constituted of the pixels within the N of pixel points (including the N of pixel points) is the second displaying area.

Alternatively, in the present embodiment, the measuring position, the reference position and the object are in a straight line.

Figure 2:
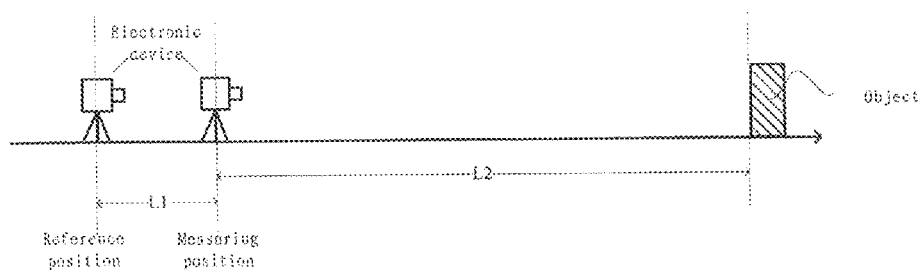
FIG. 2 is a schematic view for a measuring position between a reference position and the object in an embodiment of the present disclosure.

For example, as shown in FIG. 2, the measuring position, the reference position and the object all are in a straight line and the measuring position is between the reference position and the object.

Figure 3:
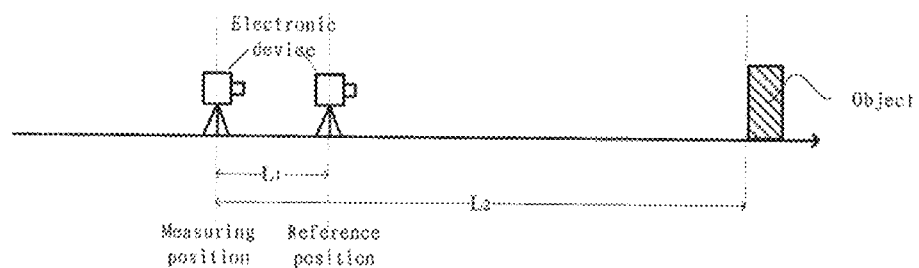
FIG. 3 is a schematic view for a reference position between a measuring position and the object in an embodiment of the present disclosure.

For example, as shown in FIG. 3, the measuring position, the reference position and the object all are in a straight line and the reference position is between the measuring position and the object.

Alternatively, between the step of S102 and the step of S103, the method may further comprise: outputting a message indicating the user to move backwards to the reference position if the first displaying area is larger than or equal to a first predefined displaying area, so that the measuring position is between the reference position and the object; and outputting a message indicating the user to move forwards to the reference position if the first displaying area is smaller than or equal to a second predefined displaying area, so that the reference position is between the measuring position and the object.

For example, as shown in FIG. 2, the electronic device may perform the steps of S101 and S102 at the measuring position to obtain the first picture including the object and to obtain the first displaying area from the first picture. At this point, if the first displaying area is larger than or equal to the first predefined displaying area (e.g. the first displaying area is much larger, which approaches to or goes beyond the total displaying area of the first picture, and the first predefined displaying area may be larger than or equal to 80% of the total displaying area of the first picture), the electronic device may output an indication message which indicates to the user to move backwards (after an actual experiment, when an object at an actual distance of about 1000 meters is measured, it only needs to move the object backwards to 0.5-1 meter so as to obtain a desired second actual distance), so that the user move the electronic device to the reference position (i.e. the measuring position is between the reference position and the object). With aid of the user, the electronic device may continue to perform the step of S103 at the reference position to obtain the second picture including the object.

For example, as shown in FIG. 3, the electronic device may perform the steps of S101 and S102 at the measuring position to obtain the first picture including the object and to obtain the first displaying area from the first picture. At this point, if the first displaying area is smaller than or equal to the second predefined displaying area (e.g. the second predefined displaying area may be smaller than or equal to 20% of the total displaying area of the first picture), the electronic device may output an indication message which indicates to the user to move forwards (after an actual experiment, when an object at an actual distance of about 1000 meters is measured, it only needs to move the object forwards to 0.5-1 meter so as to obtain a desired second actual distance), so that the user move the electronic device to the reference position (i.e. the reference position is between the measuring position and the object). With aid of the user, the electronic device may continue to perform the step of S103 at the reference position to obtain the second picture including the object.

Alternatively, as shown in FIG. 2, in the present embodiment, when a first focal length for collecting the first picture is identical to a second focal length for collecting the second picture and the measuring position is between the reference position and the object, the second actual distance is determined based on the following equation (1):

$$L_2 = (-1)^n L_1 \frac{\sqrt{C_2}}{\sqrt{C_1} - \sqrt{C_2}} \quad (1)$$

in which, $L_2$ is the second actual distance; $L_1$ is the first actual distance; $C_1$ is the first displaying area; $C_2$ is the second displaying area.

For example, as shown in FIG. 2, when the actual distance from the object at a long distance to the measuring position, and the focal length of the camera is fixed constantly (the focal length of the camera can be omitted), an arithmetic square root of the area of the object in the picture is inversely proportional to the actual distance from the object to the measuring position, and there is a relationship of $$\sqrt{\frac{C_1}{C_2}} \approx \frac{L_2}{L_1 + L_2}$$

so as to derive the equation (1).

Figure 4:
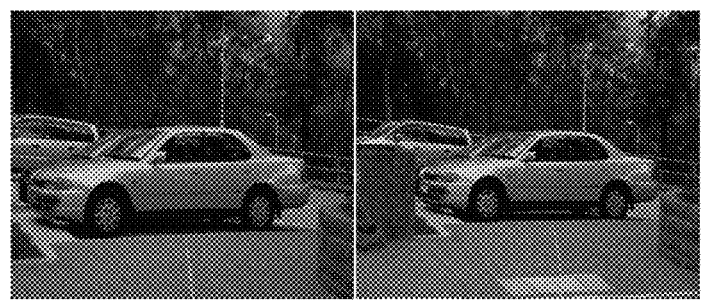
FIG. 4 is a schematic view of the step 101 and the step 103 in an embodiment of the present disclosure.
Figure 5:
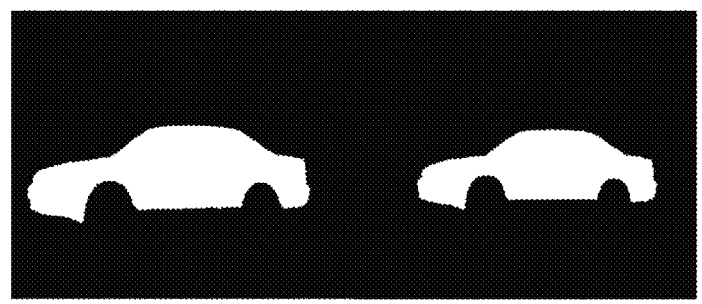
FIG. 5 is a schematic view of the step 102 and the step 104 in an embodiment of the present disclosure.
Figure 6:
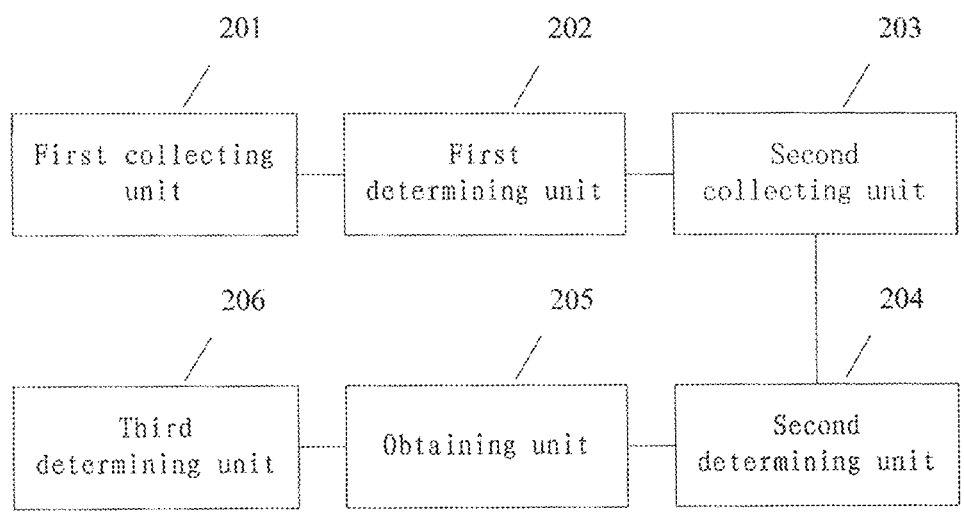
FIG. 6 is a structural schematic view of the electronic device in an embodiment of the present disclosure.

For example, as shown in FIG. 4, the object is a car, for example. When the measuring position is between the reference position and the object, a first picture is obtained at the measuring position (the left picture in FIG. 4) and a second picture is obtained at a reference position (the right picture in FIG. 4). Furthermore, as shown in FIG. 5, a first displaying area (the area of the white region in the left picture of FIG. 5) and a second displaying area (the area of the white region in the right picture of FIG. 5) are obtained, respectively. Furthermore, the actual distance from the car to the measuring position (i.e. the second actual distance) is determined based on the equation (1).

After an actual test, the error rate of the present embodiment is less than 5%, which represents a higher accuracy rating.

Alternatively, as shown in FIG. 3, in the present embodiment, when a first focal length for collecting the first picture is identical to a second focal length for collecting the second picture and the reference position is between the measuring position and the object, the second actual distance is determined based on the following equation (2):

$$L_2 = L_1 \frac{\sqrt{C_2}}{\sqrt{C_2} - \sqrt{C_1}} \quad (2)$$

in which, $L_2$ is the second actual distance; $L_1$ is the first actual distance; $C_1$ is the first displaying area; $C_2$ is the second displaying area.

For example, as shown in FIG. 3, when the actual distance from the object at a long distance to the measuring position, and the focal length of the camera is fixed constantly (the focal length of the camera can be omitted), an arithmetic square root of the area of the object in the picture is inversely proportional to the actual distance from the object to the measuring position, and there is a relationship of $$\sqrt{\frac{C_1}{C_2}} \approx \frac{L_2}{L_2 + L_1}$$

so as to derive the equation (2).

For example, as shown in FIG. 4, the object is a car, for example. When the measuring position is between the reference position and the object, a first picture is obtained at the measuring position (the right picture in FIG. 4) and a second picture is obtained at a reference position (the left picture in FIG. 4). Furthermore, as shown in FIG. 5, a first displaying area (the area of the white region in the right picture of FIG. 5) and a second displaying area (the area of the white region in the left picture of FIG. 5) are obtained, respectively. Furthermore, the actual distance from the car to the measuring position (i.e. the second actual distance) is determined based on the equation (2).

After an actual test, the error rate of the present embodiment is less than 5%, which represents a higher accuracy rating.

Alternatively, when the first focal length for collecting the first picture is different from the second focal length for collecting the second picture, the step of S106 may comprise steps of: adjusting the first displaying area and the second displaying area based on the first focal length and the second focal length, so as to obtain a first adjusted displaying area and a second adjusted focal length of the object at the same focal length; and determining the second actual distance based on the first adjusted displaying area, the second adjusted displaying area and the first actual distance.

In the present embodiment, since the effect of the change of the focal lengths between the two times of image collection on the calculating result of the second actual distance is eliminated, a technical effect of determining the second actual distance based on the two picture obtained at different focal lengths is implemented when the focal lengths are changed.

Alternatively, as shown in FIG. 2, in the present embodiment, when the first focal length for collecting the first picture is different from the second focal length for collecting the second picture, and the measuring position is between the reference position and the object, the second actual distance is determined based on the following equation (3):

$$L_2 = (-1)^n L_1 \frac{f_2 \sqrt{C_2}}{f_1 \sqrt{C_2} - f_2 \sqrt{C_1}} \quad (3)$$

in which, $L_2$ is the second actual distance; $L_1$ is the first actual distance; $C_1$ is the first displaying area; $C_2$ is the second displaying area; $f_1$ is the first focal length; and $f_2$ is the second focal length.

For example, as shown in FIG. 2, when the focal length for the camera is changed, an arithmetic square root of the adjusted displaying area of the object in the picture is inversely proportional to the actual distance from the object to the measuring position, and there is a relationship of $$\sqrt{\frac{C_1}{C_2}} \approx \frac{f_1}{f_2}\left(\frac{L_2}{L_2 + L_1}\right)$$

so as to derive the equation (3).

After an actual test, the error rate of the present embodiment is less than 5%, which represents a higher accuracy rating.

Alternatively, as shown in FIG. 3, in the present embodiment, when the first focal length for collecting the first picture is different from the second focal length for collecting the second picture, and the reference position is between the measuring position and the object, the second actual distance is determined based on the following equation (4):

$$L_2 = -L_1 \frac{f_2 \sqrt{C_2}}{f_1 \sqrt{C_2} - f_2 \sqrt{C_1}} \quad (3)$$

in which, $L_2$ is the second actual distance; $L_1$ is the first actual distance; $C_1$ is the first displaying area; $C_2$ is the second displaying area; $f_1$ is the first focal length; and $f_2$ is the second focal length.

For example, as shown in FIG. 3, when the focal length for the camera is changed, an arithmetic square root of the adjusted displaying area of the object in the picture is inversely proportional to the actual distance from the object to the measuring position, and there is a relationship of $$\sqrt{\frac{C_1}{C_2}} \approx \frac{f_1}{f_2}\left(\frac{L_2}{L_2 - L_1}\right)$$

so as to derive the equation (4).

After an actual test, the error rate of the present embodiment is less than 5%, which represents a higher accuracy rating.

Based on the same inventive concept, the present embodiment provides an electronic device including an image collection unit or connected to an image collection unit. The electronic device may further comprise: a first collecting unit 201 configure to control the image collection unit to collect an image of an object at a measuring position to obtain a first picture including the object; a first determining unit 202 configured to determine a first displaying area of the object in the first picture; a second collecting unit 203 configured to control the image collection unit to collect an image of the object at a reference position to obtain a second picture including the object, the measuring position being different from the reference position; a second determining unit 204 configured to determine a second displaying area of the object in the second picture; an obtaining unit 205 configured to obtain a first actual distance from the measuring position to the reference position; and a third determining unit 206 configured to determine a second actual distance from the object to the measuring position based on the first displaying area, the second displaying area and the first actual distance.

In the embodiment, since the displaying area of the object in the picture may reflect the actual distance from the object to the electronic device (in general, the larger the displaying area is, the smaller the corresponding actual distance is; and the smaller the displaying are is, the larger the corresponding actual distance is) and the measuring position and the reference position can be freely adjusted by the user without any limitation on the size of the mobile phone, the technical problem in which the method for measuring a distance can't measure the long distance far away can be effectively solved by the present embodiment, and the object at a long distance may be measured so as to get a technical effect of improving the user's experience.

Alternatively, the first determining unit 202 is particularly configured to: determine M characteristic pixel points from the first picture, in which the M characteristic pixel points are pixel points at edges of the object in the first picture; and determine the first displaying area based on the M characteristic pixel points.

The second determining unit 204 is particularly configured to determine N characteristic pixel points from the second picture, in which the N characteristic pixel points are pixel points at edges of the object in the second picture; and determine the second displaying area based on the N characteristic pixel points.

Alternatively, in the present embodiment, the measuring position, the reference position and the object are in a straight line.

Alternatively, in the present embodiment, the electronic device may further comprise an output unit, configured to, between the step of determining a first displaying area of the object in the first picture and the step of controlling the image collection unit to collect an image of the object at a reference position to obtain a second picture including the object, if the first displaying area is larger than or equal to a first predefined displaying area, output a message indicating the user to move backwards to the reference position, so that the measuring position is between the reference position and the object; and if the first displaying area is smaller than or equal to a second predefined displaying area, output a message indicating the user to move forwards to the reference position, so that the reference position is between the measuring position and the object.

Alternatively, when a first focal length for collecting the first picture is identical to a second focal length for collecting the second picture, the third determining unit 206 is configured to determine the second actual distance based on the following equation:

$$L_2 = (-1)^n L_1 \frac{\sqrt{C_2}}{\sqrt{C_1} - \sqrt{C_2}}$$

in which, $L_2$ is the second actual distance; $L_1$ is the first actual distance; $C_1$ is the first displaying area; and $C_2$ is the second displaying area. When the measuring position is between the reference position and the object, n is an even number; and when the reference position is between the measuring position and the object, n is an odd number.

Alternatively, when the first focal length for collecting the first picture is different from the second focal length for collecting the second picture, the third determining unit 206 is configured to adjust the first displaying area and the second displaying area based on the first focal length and the second focal length, so as to obtain a first adjusted displaying area and a second adjusted focal length of the object at the same focal length; and determine the second actual distance based on the first adjusted displaying area, the second adjusted displaying area and the first actual distance.

Alternatively, when the first focal length for collecting the first picture is different from the second focal length for collecting the second picture, the third determining unit 206 is configured to determine the second actual distance based on the following equation:

$$L_2 = (-1)^n L_1 \frac{f_2 \sqrt{C_2}}{f_1 \sqrt{C_2} - f_2 \sqrt{C_1}}$$

in which, $L_2$ is the second actual distance; $L_1$ is the first actual distance; $C_1$ is the first displaying area; $C_2$ is the second displaying area; $f_1$ is the first focal length; and $f_2$ is the second focal length. When the measuring position is between the reference position and the object, n is an even number; and when the reference position is between the measuring position and the object, n is an odd number.

Since the electronic device according to the present embodiment is an electronic device used to implement the method for measuring a distance according to one embodiment the present disclosure, those skilled in the art may understand the particular implementation and its variants based on the method for measuring a distance according to one embodiment of the present disclosure and it would not illustrate in detail how the electrode device may implement the method according to one embodiment of the present disclosure. The electronic device which is used to implement the method for measuring a distance according to one embodiment of the present disclosure by those skilled in the art falls to the scope of the present disclosure.

It can be appreciated by those skilled in the art that the embodiments of the present invention can be implemented as a method, a system or a computer program product. The present invention may include pure hardware embodiments, pure software embodiments and any combination thereof. Also, the present invention may include a computer program product implemented on one or more computer readable storage medium (including, but not limited to, magnetic disk storage, CD-ROM, optical storage) containing computer readable program codes.

The present invention have been described with reference to the flowcharts and/or block diagrams of the method, device (system) and computer program product according to the embodiments of the present invention. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In particularly, the computer program instructions corresponding to the method for measuring a distance according to the embodiment of the present disclosure may be stored on a storage medium such as an optical disk, a hard disk or a U-disk. When the computer program instruction corresponding to the information processing method and stored on the storage medium is read or executed by one electronic device, it comprise the following steps of: controlling the image collection unit to collect an image of an object at a measuring position to obtain a first picture including the object; determining a first displaying area of the object in the first picture; controlling the image collection unit to collect an image of the object at a reference position to obtain a second picture including the object, the measuring position being different from the reference position; determining a second displaying area of the object in the second picture; obtaining a first actual distance from the measuring position to the reference position; and determining a second actual distance from the object to the measuring position based on the first displaying area, the second displaying area and the first actual distance.

Alternatively, when the computer program instruction corresponding to the step of determining a first displaying area of the object in the first picture is executed, it particularly comprises the following steps of: determining M characteristic pixel points from the first picture, in which the M characteristic pixel points are pixel points at edges of the object in the first picture; and determining the first displaying area based on the M characteristic pixel points.

Alternatively, when the computer program instruction corresponding to the step of determining a second displaying area of the object in the second picture, it particularly comprises the steps as follows: determining N characteristic pixel points from the second picture, in which the N of characteristic pixel points are pixel points at edges of the object in the second picture; and determining the second displaying area based on the N of characteristic pixel points.

Alternatively, the measuring position, the reference position and the object are in a straight line.

Alternatively, the storage medium may further store other computer instructions which are executed between the step of determining a first displaying area of the object in the first picture and the step of controlling the image collection unit to collect an image of the object at a reference position to obtain a second picture including the object, it further comprises the following steps of, when the other computer instructions are executed: outputting a message indicating the user to move backwards to the reference position if the first displaying area is larger than or equal to a first predefined displaying area, so that the measuring position is between the reference position and the object; and outputting a message indicating the user to move forwards to the reference position if the first displaying area is smaller than or equal to a second predefined displaying area, so that the reference position is between the measuring position and the object.

Alternatively, when a first focal length for collecting the first picture is identical to a second focal length for collecting the second picture, the second actual distance is determined based on the following equation:

$$L_2 = (-1)^n L_1 \frac{\sqrt{C_2}}{\sqrt{C_1} - \sqrt{C_2}}$$

in which, $L_2$ is the second actual distance; $L_1$ is the first actual distance; $C_1$ is the first displaying area; $C_2$ is the second displaying area; when the measuring position is between the reference position and the object, n is an even number; and when the reference position is between the measuring position and the object, n is an odd number.

Alternatively, when the first focal length for collecting the first picture is different from the second focal length for collecting the second picture, when the computer instructions stored in the storage medium and corresponding to the step of determining the second actual distance from the object to the measuring position based on the first displaying area, the second displaying area and the first actual distance are executed, it comprises the following steps of, when the computer instructions are executed: adjusting the first displaying area and the second displaying area based on the first focal length and the second focal length, so as to obtain a first adjusted displaying area and a second adjusted focal length of the object at the same focal length; and determining the second actual distance based on the first adjusted displaying area, the second adjusted displaying area and the first actual distance.

Alternatively, when the first focal length for collecting the first picture is different from the second focal length for collecting the second picture, the second actual distance is determined based on the following equation:

$$L_2 = (-1)^n L_1 \frac{f_2 \sqrt{C_2}}{f_1 \sqrt{C_2} - f_2 \sqrt{C_1}}$$

in which, $L_2$ is the second actual distance; $L_1$ is the first actual distance; $C_1$ is the first displaying area; $C_2$ is the second displaying area; $f_1$ is the first focal length; $f_2$ is the second focal length; when the measuring position is between the reference position and the object, n is an even number; and when the reference position is between the measuring position and the object, n is an odd number.

Although preferred embodiments of the present invention have been described, the skilled in the art may make additional variations and modifications on these embodiments once he knows the basic inventive concept. Therefore, the appended claims intend to be explained as including the preferred embodiments and all of variations and modifications falling into the scope of the present invention.

Obviously, various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

I claim:

1. A method for measuring a distance, the method comprising:
   controlling a hardware processor to collect an image of a fixed object at a measuring position to obtain a first picture including the fixed object;
   determining a first displaying area of the fixed object in the first picture;
   controlling the hardware processor to collect an image of the fixed object at a reference position to obtain a second picture including the fixed object, the measuring position being different from the reference position;
   determining a second displaying area of the fixed object in the second picture;
   obtaining a first actual distance from the measuring position to the reference position; and
   determining a second actual distance from the fixed object to the measuring position based on the first displaying area, the second displaying area and the first actual distance,
   wherein the measuring position, the reference position and the fixed object are in a straight line,
   when a first focal length for collecting the first picture is identical to a second focal length for collecting the second picture, the second actual distance is determined based on the following equation:

$$L_2 = (-1)^n L_1 \frac{\sqrt{C_2}}{\sqrt{C_1} - \sqrt{C_2}}$$

in which, $L_2$ is the second actual distance; $L_1$ is the first actual distance; $C_1$ is the first displaying area; $C_2$ is the second displaying area; when the measuring position is between the reference position and the fixed object, n is an even number; and when the reference position is between the measuring position and the fixed object, n is an odd number.

2. The method according to claim 1, wherein the step of determining a first displaying area of the fixed object in the first picture comprising:
   determining M characteristic pixel points from the first picture, in which the M characteristic pixel points are pixel points at edges of the fixed object in the first picture;
   determining the first displaying area based on the M characteristic pixel points;

the step of determining a second displaying area of the fixed object in the second picture comprising:
  determining N characteristic pixel points from the second picture, in which the N characteristic pixel points are pixel points at edges of the fixed object in the second picture; and
  determining the second displaying area based on the N characteristic pixel points.

3. The method according to claim 1, wherein, between the step of determining a first displaying area of the fixed object in the first picture and the step of controlling the hardware processor to collect an image of the fixed object at a reference position to obtain a second picture including the fixed object, the method further comprising:
  outputting a message indicating the user to move backwards to the reference position if the first displaying area is larger than or equal to a first predefined displaying area; and
  outputting a message indicating the user to move forwards to the reference position when the first displaying area is smaller than or equal to a second predefined displaying area.

4. The method according to claim 1, wherein, when the first focal length for collecting the first picture is different from the second focal length for collecting the second picture; the step of determining the second actual distance from the fixed object to the measuring position based on the first displaying area, the second displaying area and the first actual distance comprising:
  adjusting the first displaying area and the second displaying area based on the first focal length and the second focal length, so as to obtain a first adjusted displaying area and a second adjusted focal length of the fixed object at the same focal length; and
  determining the second actual distance based on the first adjusted displaying area, the second adjusted displaying area and the first actual distance.

5. The method according to claim 4, wherein, when the first focal length for collecting the first picture is different from the second focal length for collecting the second picture, the second actual distance is determined based on the following equation:

$$L_2 = (-1)^n L_1 \frac{f_2 \sqrt{C_2}}{f_1 \sqrt{C_2} - f_2 \sqrt{C_1}}$$

in which, $L_2$ is the second actual distance; $L_1$ is the first actual distance; $C_1$ is the first displaying area; $C_2$ is the second displaying area; $f_1$ is the first focal length; $f_2$ is the second focal length; when the measuring position is between the reference position and the fixed object, n is an even number; and when the reference position is between the measuring position and the fixed object, n is an odd number.

6. An electronic device, including a hardware processor, wherein the hardware processor is adapted to:
  collect an image of a fixed object at a measuring position to obtain a first picture including the fixed object;
  determine a first displaying area of the fixed object in the first picture;
  collect an image of the fixed object at a reference position to obtain a second picture including the fixed object, the measuring position being different from the reference position;
  determine a second displaying area of the fixed object in the second picture;
  obtain a first actual distance from the measuring position to the reference position; and
  determine a second actual distance from the fixed object to the measuring position based on the first displaying area, the second displaying area and the first actual distance,
  wherein the measuring position, the reference position and the fixed object are in a straight line,
  when a first focal length for collecting the first picture is identical to a second focal length for collecting the second picture, the hardware processor is adapted to determine the second actual distance based on the following equation:

$$L_2 = (-1)^n L_1 \frac{\sqrt{C_2}}{\sqrt{C_1} - \sqrt{C_2}}$$

in which, $L_2$ is the second actual distance; $L_1$ is the first actual distance; $C_1$ is the first displaying area; $C_2$ is the second displaying area; when the measuring position is between the reference position and the fixed object, n is an even number; and when the reference position is between the measuring position and the fixed object, n is an odd number.

7. The electronic device according to claim 6, wherein the hardware processor is further adapted to:
  determine M characteristic pixel points from the first picture, in which the M characteristic pixel points are pixel points at edges of the fixed object in the first picture;
  determine the first displaying area based on the M characteristic pixel points;
  determine N characteristic pixel points from the second picture, in which the N characteristic pixel points are pixel points at edges of the fixed object in the second picture; and
  determine the second displaying area based on the N characteristic pixel points.

8. The electronic device according to claim 6, wherein the hardware processor is further adapted to:
  between the step of determining a first displaying area of the fixed object in the first picture and the step of collecting an image of the fixed object at a reference position to obtain a second picture including the fixed object, output a message indicating the user to move backwards to the reference position if the first displaying area is larger than or equal to a first predefined displaying area; and output a message indicating the user to move forwards to the reference position when the first displaying area is smaller than or equal to a second predefined displaying area.

9. The electronic device according to claim 6, wherein when the first focal length for collecting the first picture is different from the second focal length for collecting the second picture, the hardware processor is further adapted to
  adjust the first displaying area and the second displaying area based on the first focal length and the second focal length, so as to obtain a first adjusted displaying area and a second adjusted focal length of the fixed object at the same focal length; and
  determine the second actual distance based on the first adjusted displaying area, the second adjusted displaying area and the first actual distance.

10. The electronic device according to claim 9, wherein when the first focal length for collecting the first picture is different from the second focal length for collecting the second picture, the hardware processor is further adapted to determine the second actual distance based on the following equation:

$$L_2 = (-1)^n L_1 \frac{f_2 \sqrt{C_2}}{f_1 \sqrt{C_2} - f_2 \sqrt{C_1}}$$

in which, $L_2$ is the second actual distance; $L_1$ is the first actual distance; $C_1$ is the first displaying area; $C_2$ is the second displaying area; $f_1$ is the first focal length; $f_2$ is the second focal length; when the measuring position is between the reference position and the fixed object, n is an even number; and when the reference position is between the measuring position and the fixed object, n is an odd number.

11. A non-transitory computer readable medium storing a computer program, the computer program comprising computer program code means adapted to perform all the steps of claim 1 when said program is run on a computer.

* * * * *